United States Patent
Hsu et al.

(10) Patent No.: US 7,039,711 B2
(45) Date of Patent: May 2, 2006

(54) NETWORK APPARATUS CAPABLE OF AUTOMATICALLY CONFIGURING CONNECTION POLARITIES AND THE OPERATING METHOD THEREOF

(75) Inventors: Ming-Hsun Hsu, Taipei (TW); Ko-Yan Shih, Taipei (TW)

(73) Assignee: VIA Technologies, Inc., Taipei (TW)

( * ) Notice: Subject to any disclaimer, the term of this patent is extended or adjusted under 35 U.S.C. 154(b) by 723 days.

(21) Appl. No.: 10/135,818

(22) Filed: Apr. 30, 2002

(65) Prior Publication Data

US 2003/0005131 A1    Jan. 2, 2003

(30) Foreign Application Priority Data

Jun. 29, 2001    (TW) ................. 90115920 A

(51) Int. Cl.
*G06F 15/16*    (2006.01)
(52) U.S. Cl. ............ 709/228; 709/250; 709/220; 370/254
(58) Field of Classification Search ........... 709/228, 709/220, 250; 370/254
See application file for complete search history.

(56) References Cited

U.S. PATENT DOCUMENTS

| | | | | |
|---|---|---|---|---|
| 5,469,437 A | * | 11/1995 | Runaldue | 370/445 |
| 5,809,249 A | * | 9/1998 | Julyan | 709/223 |
| 5,892,926 A | * | 4/1999 | Witkowski et al. | 710/100 |
| 6,175,865 B1 | * | 1/2001 | Dove et al. | 709/220 |
| 6,460,078 B1 | * | 10/2002 | Dove et al. | 709/220 |
| 6,684,347 B1 | * | 1/2004 | Coffey | 714/43 |
| 2004/0198105 A1 | * | 10/2004 | Dove | 439/894 |
| 2005/0036506 A9 | * | 2/2005 | Dove | 370/463 |

FOREIGN PATENT DOCUMENTS

EP    1494416 A2  *  1/2005

* cited by examiner

*Primary Examiner*—Rupal Dharia
*Assistant Examiner*—Chirag R Patel
(74) *Attorney, Agent, or Firm*—Volpe and Koenig, P.C.

(57) ABSTRACT

A network apparatus capable of automatically configuring connection polarity includes a random number generator of a plural order for generating a plurality of random numbers, and a plurality of connectors each of which is connected to a corresponding network cable. Each of the connectors includes a signal detector for detecting a network signal, for example, a fast link pulse or a normal link pulse from the corresponding network cable, and a polarity configurer coupled between the signal detector and the random number generator for selectively changing a connection polarity of a connector thereof in accordance with one of the random numbers generated by the random number generator when the signal detector fails to detect a network signal from the corresponding network cable.

17 Claims, 3 Drawing Sheets

NETWORK APPARATUS CAPABLE OF AUTOMATICALLY CONFIGURING CONNECTION POLARITIES AND THE OPERATING METHOD THEREOF

FIELD OF THE INVENTION

The present invention is related to a network apparatus capable of automatically configuring connection polarities, and in particular to a network apparatus capable of automatically configuring polarities in a 10 Base-T, 100 Base-T and 1000 Base-T network.

BACKGROUND OF THE INVENTION

In a typical local area network, a parallel cable or crossover cable is generally used to interconnect a number of network apparatuses, for example, hubs, switches, repeaters or network cards, etc.

As depicted in FIG. 1, if it is desirous to interconnect two network interface cards (NIC) crisscross, a crossover cable must be employed to allow the transmitter 12 and the receiver 14 of a network interface card to respectively connect to the receiver 24 and the transmitter 22 of another network interface card, so as to form a valid network connection. On the other hand, if it is desirous to connect a network interface card to a switch, a parallel cable must be employed to assure the validity of connection polarities. If it is desirous to interconnect network apparatuses, one has to choose proper network cable to bring them to a correct connection polarity. However, it is quite a torment to a network user.

Therefore, if two network apparatuses in a local area network need to be interconnected crisscross, that is, the polarities of the transmit pair and the receive pair are needed to be exchanged, it is generally accomplished by a manual MDIX (medium-dependent interface crossover) switch. It indicates the manual switching of the transmission/reception polarity on the connector can be achieved by a user to manually push a button.

If two network apparatuses are of different data transmission rates, for instance, those in 10 Base-T (10 MHz), 100 Base-T (100 MHz) and 1000 Base-T (GHz) networks that transmits data with different data transmission rates, it is unlikely to automatically configure connection polarities through the use of prior connection polarity configuration technique.

Besides, the so-called auto-negotiation capability enables different interconnected network apparatuses to work under an optimized operating mode, including full-duplex, half-duplex and so on. However, if the network apparatuses are interconnected with incorrect polarity, it is unable to bring the auto-negotiation mechanism into full play.

It is therefore a major object of the present invention to provide a universal network apparatus capable of automatically configuring connection polarities in a network and the operating method thereof.

SUMMARY OF THE INVENTION

The present invention discloses a network apparatus capable of automatically configuring connection polarities in a network. The network apparatus can be a switch or hub, and including a plural order random number generator for generating a plurality of random numbers, a plurality of connectors each of which is connected to a corresponding network cable, wherein each connector includes a signal detector for detecting a signal, for example, a normal link pulse or a fast link pulse from the corresponding network cable, and a polarity configurer coupled between the signal detector and the random number generator for selectively changing a connection polarity of a connector thereof in accordance with one of the random numbers generated by the random number generator when no signal is detected by the signal detector from the corresponding network cable. The signal detector further includes a status counter for counting a first predetermined time period to determine the connection polarity of the corresponding network cable, and counting a second predetermined time period to allow the auto-negotiation process to be completed.

The first predetermined time period is preferably set at 62 milliseconds and the second predetermined time period is preferably set at 1.8 seconds. The network apparatus is applicable to a 10 Base-T, 100 Base-T and 1000 Base-T network simultaneously and is provided with auto-negotiation capability.

The present invention also addresses a method of automatically configuring a connection polarity for a network apparatus, including the following steps of enabling the network apparatus to operate in either a medium-dependent interface test mode or a medium-dependent interface crossover test mode, detecting a network signal within a first time period, selectively enabling the network apparatus to operate in either the medium-dependent interface test mode or the medium-dependent interface crossover test mode in accordance with a random number if failing to detect a network signal within the first time period, and enabling the network apparatus to stay at a stable state for at least a second time period if a network signal is detected or a link is established within the first time period, wherein if a network signal is continuously detected or a link is established, enabling the network apparatus to keep staying at the stable state.

Now the foregoing and other features and advantages of the present invention will be more clearly understood through the following descriptions with reference to the accompanying drawings, in which:

DETAILED DESCRIPTION OF THE PREFERRED EMBODIMENT

In general, a network apparatus such as switch or hub is provided with a plurality of connectors, and each of the connectors is provided with a network interface.

Figure 1:
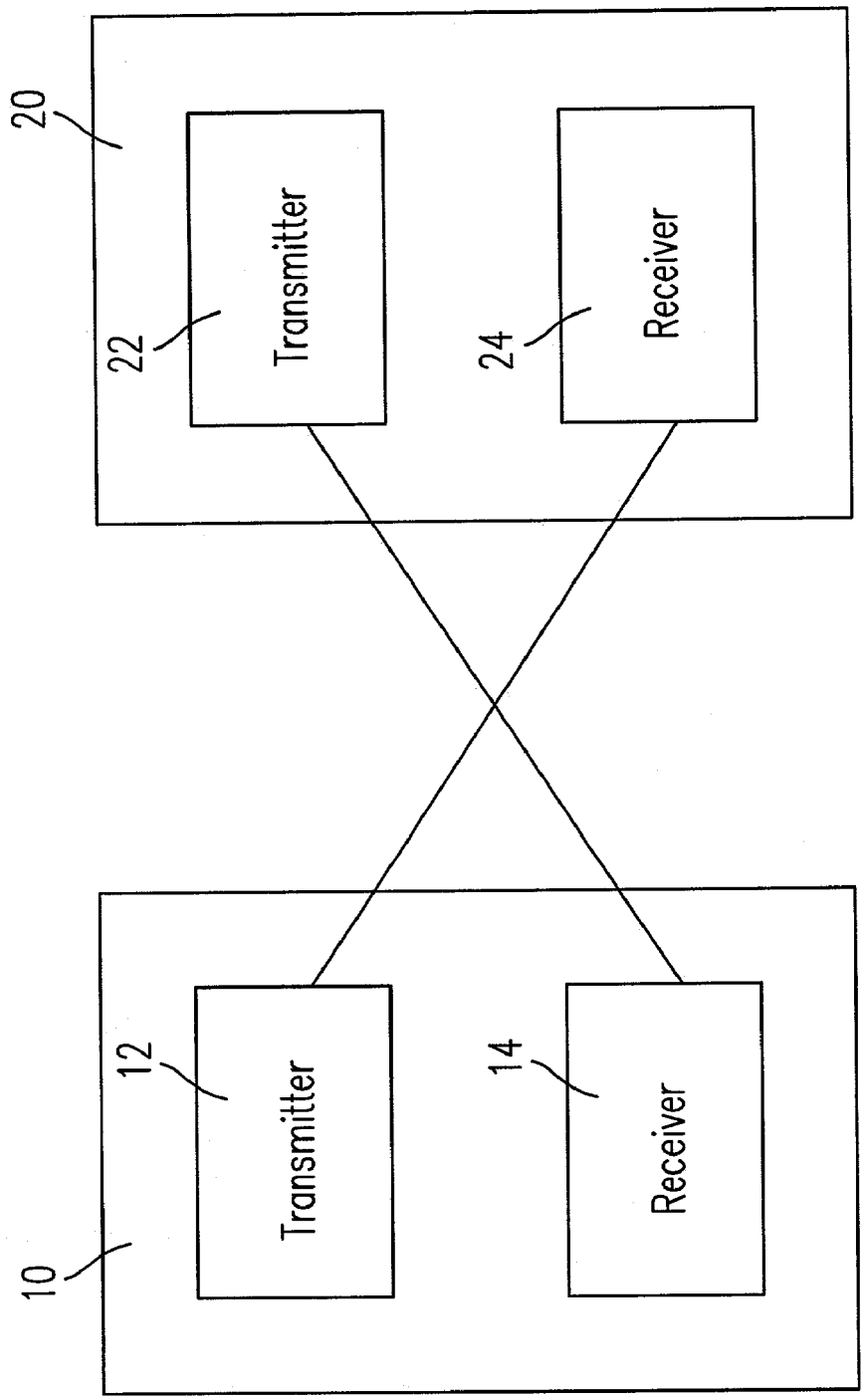
FIG. 1 is a schematic diagram showing a MDI enabling network interface card connecting to a network interface of a hub according to the prior art.
Figure 2:
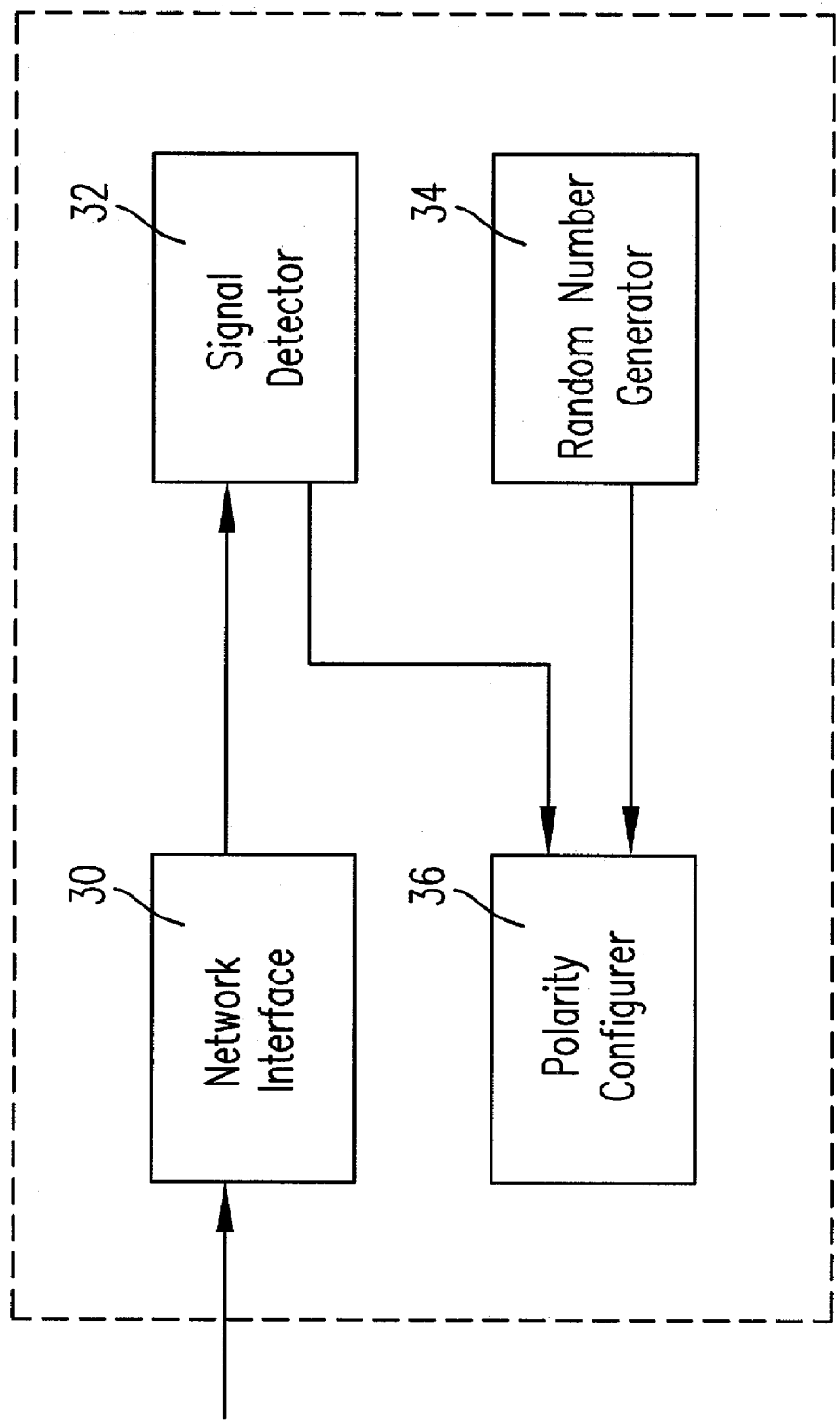
FIG. 2 is a functional block diagram showing the network apparatus capable of automatically configuring connection polarities in a network according to a preferred embodiment of the present invention.

As indicated in FIG. 2, a network apparatus capable of automatically configuring connection polarities in a network according to a first preferred embodiment of the present invention includes a MDI(media dependent interface) enabling network interface 30, such as a RJ-45 connector that is used to connect to a network cable. The network apparatus of the present invention further includes a signal detector 32 which is coupled to the output of the MDI enabling network interface 30 for detecting a network signal from the network cable to determine whether the transmitted data is valid, that is, to check whether there is data received. The signal detector 32 further can be used to determine the data transmission rate over the network cable, for example, 10 MHz or 100 MHz. If the transmitted data is valid, the way of data transmission remains unchanged. Otherwise, a random number generator 34 will generate a random number and output the random number to a polarity configurer 36. The polarity configurer 36 selectively provides control signals for the MDI enabling network interface 30 to switch its connection polarity according to the random number from the random number generator 34. That is to say, the random number from the random number generator 34 is used to determine whether the assignment of the TX(transmission)/RX(reception) pins of the MDI enabling network interface 30 is to remain unchanged or to be switched.

Further, the operation algorithm of the network apparatus of the present invention can be better illustrated from the point of view of a state machine.

Figure 3:
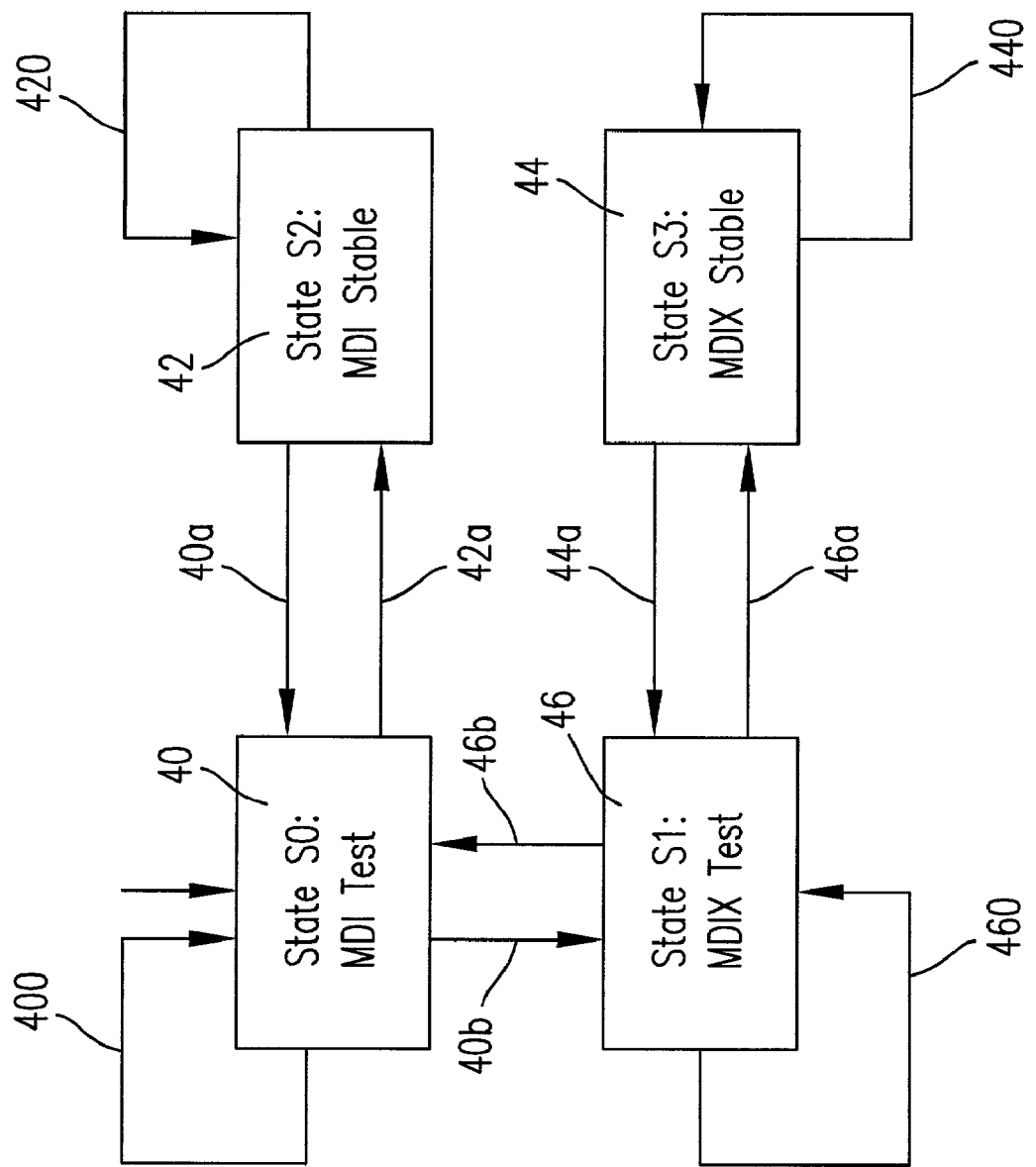
FIG. 3 is a state diagram illustrating the algorithm of an internal MDI/MDIX state machine of the network apparatus according to a preferred embodiment of the present invention.

FIG. 3 is a state diagram illustrating the operation algorithm of an internal MDI/MDIX state machine of the network apparatus according to a preferred embodiment of the present invention. In this preferred embodiment, it is inclined to take a network apparatus applicable to a 10 Base-T, a 100 Base-T and a 1000 Base-T network and is provided with auto-negotiation capability as an example for illustration.

As shown in FIG. 3, when the network apparatus resets or powers on, the operation flow of the network apparatus initiates from block 40 (state S0), that is, the network apparatus operates in MDI test mode. In state S0, the status counter of the signal detector 32 starts to count, and the operation of the network apparatus will stay at the same state for at least a first predetermined time period through the circulative execution of the loop 400. More preferably, the first predetermined time period is set at 62 milliseconds (which is conformable to the link period prescription in IEEE standard 802.3). The signal detector 32 continuously detects a network signal, or detects a link pulse, for example, a normal link pulse or a fast link pulse. If the status counter 32 reaches the first predetermined time period, and no network signal is detected or no link is established, the random number generator 34 generates a random number to determine whether the operation of the network apparatus stays at state S0 or goes to state S1. Otherwise, if the signal detector 32 detects a network signal or a link is established within the first predetermined time period, it indicates that the current connection configuration is correct, namely, the network apparatus operates in MDI mode, the operation of the network apparatus will go to block 42 (state S2) via path 42a, which indicates the network apparatus operates in a stable state of MDI mode.

In state S2, the operation of the network apparatus will stay at the same state for at least a second predetermined time period, preferably 1.8 seconds (which is the time period required to complete the auto-negotiation process). If data is continuously received or a link is established, it indicates the network apparatus operates in a stable state of MDI mode and its operation is normal, and the operation of the network apparatus keeps staying at state S2 through the circulative execution of loop 420 to repeat the MDI test mode operation.

On the other hand, if no data is received or no link is established within the second predetermined time period in state S2, the operation of the network apparatus returns back to state S0 via path 40a. This situation could occur if the link is down or the other side network apparatus is changed or the other side network apparatus fails to transmit data over a period of time.

As discussed above, in state S0 if no network signal is detected or no link is established, the random number generator 34 generates a random number. The intention of using the random number generator 34 is to prevent two universal MDI/MDIX enabling network interfaces that change their polarities simultaneously all the time but can not identify each other from failing to link. While the random number determines the operation of the network apparatus to go to block 46, that is, state S1, it indicates that the network apparatus operates in MDIX test mode. In state S1, the status counter is reset and the operation of the network apparatus stays at state S1 for at least a first predetermined time period, more preferably 62 milliseconds (which is conformable to the link period prescription in IEEE standard 802.3). The signal detector 32 continuously detects a network signal or detects whether a link is established. If the status counter reaches the first predetermined time period, and no network signal is received or no link is established, the random number generator 34 generates a random number to determine whether the operation of the network apparatus stays at state S1 or goes back to state S0. Otherwise, if the signal detector 32 detects a network signal or a link is established within the first predetermined time period, it indicates that the current connection configuration is correct, namely, the network apparatus operates in MDIX mode, the operation of the network apparatus will go to block 44 (state S2) via path 46a, which indicates the network apparatus operates in a stable state of MDIX mode.

In state S3, the network apparatus stays at state S3 for at least a second predetermined time period, more preferable 1.8 seconds. If data is continuously received or a link is established within the second predetermined time period, it indicates that the network apparatus stays at MDIX stable state and the operation is normal, and the operation of the network apparatus keeps staying at state S3 through the circulative execution of loop 440 to repeat the MDIX test mode operation.

For example, the foregoing random number variable can be one of thirteenth order, in which the thirteen nodes thereof is capable of generating sufficient random numbers. As far as a switch or a hub having a plurality of connectors is concerned, the automatic connection polarity configuration technique of the present invention is quite convenient for the assurance of connection polarity. From the point of view of hardware implementation, only a random number generator is necessary to be shared by a plurality of connectors.

The present invention can be summarized by a network apparatus capable of automatically configuring connection polarities to transmit and receive network signals in a network, including a random number generator of a plural order for generating a plurality of random numbers, and a plurality of connectors each of which is connected to a corresponding network cable. Each of the connectors includes a signal detector for detecting a network signal on the corresponding network cable, for example, a fast link pulse or a normal link pulse, and a polarity configurer coupled between the signal detector and the random number generator for selectively changing a connection polarity of a connector thereof in accordance with one of the random numbers generated by the random number generator when the signal detector fails to detect a network signal from the corresponding network cable. The signal detector further includes a status counter for counting a first predetermined time period for determining a connection polarity of the corresponding network cable and counting a second predetermined time period for allowing the auto-negotiation process to be completed. The first predetermined time period is preferably set at 62 milliseconds and the second predetermined time period is preferably set at 1.8 seconds. The network apparatus can be applicable to a 10 Base-T, 100 Base-T and 1000 Base-T network simultaneously and is provided with auto-negotiation capability.

The present invention also suggests a method of configuring a connection polarity for a network apparatus, including the following procedural steps of: enabling the network apparatus to operate in either a MDI test mode or a MDIX test mode, detecting a network signal within a first time period, selectively enabling the network apparatus to operate in either MDI test mode or MDIX test mode in accordance with a random number if failing to detect a network signal within the first time period, and if a network signal is detected or a link is established within the first time period, enabling the network apparatus to stay at a stable state for at least a second time period, wherein if a network signal is continuously detected or a link is established, enabling said network apparatus to keep staying at the stable state.

It is to be noted that the foregoing is intended to give a preferred embodiment of the present invention only, but is not used to be taken as an exhaustive disclosure of the present invention. Those of skill in the art will soon recognize that these and other modifications can be made within the spirit and scope of the present invention as further defined in the appended claims.

What is claimed is:

1. A network apparatus for configuring connection polarities to transmit and receive network signals in a network, comprising:
    a plural order random number generator for generating a plurality of random numbers; and
    a plurality of connectors each of which is connected to a corresponding network cable, wherein each of said plurality of connectors comprises:
        a signal detector for detecting a signal from said corresponding network cable; and
        a polarity configurer coupled between said signal detector and said random number generator for enabling said network apparatus to operate in either a medium-dependent interface test mode or a medium-dependent interface crossover test mode, detecting a network signal within a first predetermined time period, selectively enabling said network apparatus to operate in either said medium-dependent interface test mode or said medium-dependent interface crossover test mode in accordance with a random number if failing to detecting a network signal within said first predetermined time period, enabling said network apparatus to stay at a stable state for at least a second predetermined time period if a network signal is detected or a link is established within said first predetermined time period, and enabling said network apparatus to keep staying at said stable state if a network signal is continuously received or a link is established.

2. The network apparatus as claimed in claim 1 wherein said network apparatus is a hub.

3. The network apparatus of claim 1 wherein said network apparatus is a switch.

4. The network apparatus of claim 1 wherein said signal detector further includes a status counter for counting said first predetermined time period to determine a connection polarity of said corresponding network cable, and counting said second predetermined time period to allow an auto-negotiation process to be completed.

5. The network apparatus of claim 4 wherein said first predetermined time period is greater than 62 milliseconds.

6. The network apparatus of claim 4 wherein said second predetermined time period is greater than 1.8 second.

7. The network apparatus of claim 4 wherein said network apparatus is applicable to one network selected from a group consisting of a 10 Base-T network, a 100 Base-T network, and a 1000 Base-T network and is provided with an auto-negotiation capability.

8. The network apparatus of claim 1 wherein said random number generator is a thirteenth-order random number generator.

9. The network apparatus of claim 1 wherein said signal detector is configured for detecting a normal link pulse.

10. The network apparatus of claim 1 wherein said signal detector is configured for detecting a fast link pulse.

11. A method of configuring a connection polarity for a network apparatus, comprising the steps of:
    enabling said network apparatus to operate in either a medium-dependent interface test mode or a medium-dependent interface crossover test mode;
    detecting a network signal within a first predetermined time period;
    if failing to detecting a network signal within said first predetermined time period, selectively enabling said network apparatus to operate in either said medium-dependent interface test mode or said medium-dependent interface crossover test mode in accordance with a random number;
    if a network signal is detected or a link is established within said first predetermined time period and if the state is within said medium-dependent interface test mode, entering a medium-dependent interface stable mode;
    if a network signal is detected or a link is established within said first predetermined time period and if the state is within said medium-dependent interface crossover stable mode, entering a medium-dependent interface crossover stable mode;
    enabling said network apparatus to stay at said stable state for at least a second predetermined time period; and
    if a network signal is continuously received or a link is established, enabling said network apparatus to keep staying at said stable state.

12. The method of claim 11 wherein said first predetermined time period is greater than 62 milliseconds.

13. The method of claim 11 wherein said second predetermined time period is greater than 1.8 second.

14. The method of claim 11 wherein after said network apparatus is enabled to selectively operate in either said medium-dependent interface test mode or said medium-dependent interface crossover test mode in accordance with a random number, said method further comprising enabling said network apparatus to restart to operate in either said medium-dependent interface test mode or said medium-dependent interface crossover test mode if failing to detect a network signal within a third predetermined time period.

15. The method of claim 14 wherein said third predetermined time period is equal to said second predetermined time period.

16. The method of claim 11 wherein said network signal is a fast link pulse.

17. The method of claim 11 wherein said network signal is normal link pulse.

* * * * *